(12) United States Patent
Stokar et al.

(10) Patent No.: US 7,640,106 B1
(45) Date of Patent: Dec. 29, 2009

(54) HYBRID TRACKER

(75) Inventors: Saul Stokar, Raanana (IL); David Neustadter, Netania (IL)

(73) Assignee: Elbit Systems Ltd., Haifa (IL)

( * ) Notice: Subject to any disclaimer, the term of this patent is extended or adjusted under 35 U.S.C. 154(b) by 86 days.

(21) Appl. No.: 11/413,936

(22) Filed: Apr. 27, 2006

Related U.S. Application Data

(63) Continuation of application No. 11/343,486, filed on Jan. 31, 2006, now abandoned.

(30) Foreign Application Priority Data

Mar. 24, 2005 (IL) ...................................... 167648

(51) Int. Cl.
G01C 21/00 (2006.01)
G01C 9/00 (2006.01)
G01S 13/00 (2006.01)

(52) U.S. Cl. ..................... 701/214; 701/207; 701/221; 702/153; 702/150; 702/85; 702/86; 702/92; 342/147; 342/448; 342/450; 342/451; 342/463

(58) Field of Classification Search ................ 703/8, 703/2; 600/595; 701/13, 207, 214; 702/94, 702/151, 95, 141; 324/207.17
See application file for complete search history.

(56) References Cited

U.S. PATENT DOCUMENTS

| 3,868,565 | A |   | 2/1975  | Kuipers     |         |
|-----------|---|---|---------|-------------|---------|
| 5,645,077 | A |   | 7/1997  | Foxlin      |         |
| 5,812,257 | A | * | 9/1998  | Teitel et al. | 356/141.4 |
| 5,847,976 | A | * | 12/1998 | Lescourret  | 703/8   |
| 6,176,837 | B1 | * | 1/2001  | Foxlin      | 600/595 |
| 6,263,264 | B1 | * | 7/2001  | Herman et al. | 701/13 |
| 6,281,970 | B1 | * | 8/2001  | Williams et al. | 356/141.4 |
| 6,292,750 | B1 | * | 9/2001  | Lin         | 701/214 |

(Continued)

OTHER PUBLICATIONS

Magnetic Position and Orientation Tracking system; IEEE Transactions of Aerospace and Electronics Systems, vol. AES -15, No. 5 ; Sep. 1979.*

(Continued)

Primary Examiner—Dalena Tran
Assistant Examiner—Ian Jen
(74) Attorney, Agent, or Firm—Merchant & Gould P.C.

(57) ABSTRACT

Apparatus for determining the position of a selected object relative to a moving reference frame, the apparatus including at least one reference frame transceiver assembly firmly attached to the moving reference frame, at least one object transceiver assembly firmly attached to the selected object, an inertial measurement unit firmly attached to the selected object, an inertial navigation system firmly attached to the moving reference frame, and a tracking processor coupled with the object transceiver assembly, with the inertial measurement unit and with the inertial navigation system, the object transceiver assembly communicating with the reference frame transceiver assembly using magnetic fields, the inertial measurement unit producing IMU inertial measurements of motion of the selected object with respect to an inertially fixed reference frame, the inertial navigation system producing INS inertial measurements of motion of the moving reference frame with respect to the inertially fixed reference frame, the tracking processor receiving electromagnetic measurements resulting from the magnetic communication between the reference frame transceiver assembly and the object transceiver assembly, the tracking processor determining the position of the selected object relative to the moving reference frame by using the IMU inertial measurements and the INS inertial measurements to optimize the electromagnetic measurements.

18 Claims, 7 Drawing Sheets

U.S. PATENT DOCUMENTS

| | | | |
|---|---|---|---|
| 6,311,129 B1* | 10/2001 | Lin | 701/214 |
| 6,369,564 B1* | 4/2002 | Khalfin et al. | 324/207.17 |
| 6,408,245 B1* | 6/2002 | An et al. | 701/216 |
| 6,409,687 B1* | 6/2002 | Foxlin | 600/595 |
| 6,474,159 B1 | 11/2002 | Foxlin et al. | |
| 6,480,152 B2* | 11/2002 | Lin et al. | 342/357.14 |
| 6,577,976 B1* | 6/2003 | Hoff et al. | 702/95 |
| 6,658,354 B2* | 12/2003 | Lin | 701/214 |
| 6,681,629 B2* | 1/2004 | Foxlin et al. | 73/488 |
| 6,691,033 B1* | 2/2004 | Li et al. | 701/222 |
| 6,725,173 B2* | 4/2004 | An et al. | 702/141 |
| 6,738,714 B2* | 5/2004 | McCall et al. | 701/220 |
| 6,820,025 B2* | 11/2004 | Bachmann et al. | 702/94 |
| 7,000,469 B2* | 2/2006 | Foxlin et al. | 73/488 |
| 7,089,148 B1* | 8/2006 | Bachmann et al. | 702/151 |
| 7,162,367 B2* | 1/2007 | Lin et al. | 701/220 |
| 7,212,921 B2* | 5/2007 | Jeerage et | 701/214 |
| 7,277,834 B2* | 10/2007 | Bar Tal et al. | 703/2 |
| 7,355,561 B1* | 4/2008 | Clarke et al. | 345/1.1 |
| 7,409,290 B2* | 8/2008 | Lin | 701/214 |
| 2001/0020216 A1* | 9/2001 | Lin | 701/216 |
| 2002/0021245 A1* | 2/2002 | Lin et al. | 342/357.14 |
| 2002/0116125 A1* | 8/2002 | Lin | 701/214 |
| 2002/0116126 A1* | 8/2002 | Lin | 701/214 |
| 2002/0120400 A1* | 8/2002 | Lin | 701/214 |
| 2002/0194914 A1* | 12/2002 | Foxlin et al. | 73/514.01 |
| 2003/0023192 A1* | 1/2003 | Foxlin | 600/595 |
| 2003/0149528 A1* | 8/2003 | Lin | 701/214 |
| 2003/0176970 A1* | 9/2003 | Lin | 701/214 |
| 2004/0034515 A1 | 2/2004 | Bar Tal et al. | |
| 2004/0073360 A1* | 4/2004 | Foxlin | 701/207 |
| 2004/0143176 A1* | 7/2004 | Foxlin | 600/395 |
| 2004/0149036 A1* | 8/2004 | Foxlin et al. | 73/511 |
| 2004/0236509 A1* | 11/2004 | Jeerage et al. | 701/214 |
| 2005/0203701 A1* | 9/2005 | Scherzinger | 701/207 |
| 2005/0234644 A1* | 10/2005 | Lin | 701/214 |
| 2005/0240347 A1* | 10/2005 | Yang | 701/220 |
| 2005/0285591 A1* | 12/2005 | Higgins et al. | 324/207.17 |

OTHER PUBLICATIONS

Raab et al. "Magnetic Position and Orientation Tracking System." *IEEE Transcations on Aerospace and Electronic Systems*. vol. AES-15, No. 5. Sep. 1979 pp. 709-717.

* cited by examiner

HYBRID TRACKER

This application is a Continuation of application Ser. No. 11/343,486, filed Jan. 31, 2006, and which application(s) are incorporated herein by reference.

FIELD OF THE DISCLOSED TECHNIQUE

The disclosed technique relates to motion tracking in general, and to methods and systems for hybrid electromagnetic-inertial tracking, in particular.

BACKGROUND OF THE DISCLOSED TECHNIQUE

Tracking systems and methods are known in the art. In general, a tracking system is used to calculate and determine the position and orientation of an object relative to a given coordinate system in a platform. The tracked object can be, for example, a medical probe relative to a human body, the head of a pilot relative to the cockpit of a fighter jet, a person relative to a room of a building, or a ship relative to a body of water. The platform can be, for example, the human body, the cockpit of a fighter jet, a room of a building, or an entire planet. In general, tracking systems can be classified into two main categories namely, inertial trackers and non-inertial trackers.

Inertial trackers were first developed in the early twentieth century as an aid in marine navigation and later in aerial navigation. Whereas inertial trackers have grown in complexity since they were first invented, and are now used for a variety of different applications (i.e., navigational and other), the general principles behind inertial tracking remain the same. Inertial trackers essentially include a device, referred to in the art as an inertial sensor, capable of continuously measuring the linear acceleration $\vec{a}$, and the angular velocity $\vec{\omega}$, of an object relative to an inertial reference frame. The linear acceleration $\vec{a}$ may be measured using an accelerometer, and the angular velocity $\vec{\omega}$ may be measured using a gyroscope. It is noted that through mathematical integration techniques known in the art, the position and orientation of the object can be determined from $\vec{a}$ and $\vec{\omega}$ by integrating the equations of motion. Inertial tracking requires that the initial position and orientation of an object be recorded and stored. $\vec{a}$ and $\vec{\omega}$ of the object are typically measured at rapid intervals. Since the initial position and orientation of the object is known, using the equations of motion, the dynamic position and orientation of an object can be continuously predicted, based on the mathematical integration of $\vec{a}$ and $\vec{\omega}$ measurements. Therefore, given a previous estimate of the position and orientation of an object, the current position and orientation of the object can be determined by integrating the equations of motion based on newly measured values of $\vec{a}$ and $\vec{\omega}$.

Inertial trackers incorporate two additional requirements. The first requirement is an accurate model of the inertial sensor, so that raw data measured from the inertial sensor can be corrected for bias, scale factor and non-orthogonality. The second requirement is an estimation of the position and orientation of the object at sufficiently close time intervals. Accordingly, when the second requirement is met, one can assume that the current position and orientation of the object are determined by $\vec{a}$ and $\vec{\omega}$ alone, and not in addition to any other higher-order derivates of the quantities of motion, such as jerk, $\vec{a}'$ (the rate of change of acceleration) and rotational acceleration, $\vec{\alpha}$, where $\vec{\alpha}$ is the derivative of $\vec{\omega}$. If the initial position and orientation of the object are not known, then an inertial tracker cannot determine the dynamic position and orientation of the object. If either of the two aforementioned requirements is not met, then the position and orientation determined by an inertial tracker may be inaccurate.

Furthermore, inertial trackers suffer from drift. Due to the noise or jitter in the measurements of the inertial tracker, the integration of these measurements over a period of time results in a drift error, which gradually increases the inaccuracy of the final results. Drift is usually corrected by using very expensive gyroscopes or accelerometers to implement the inertial tracking measurements.

Electromagnetic (EM) tracking operates on a different principle than inertial tracking. In general, electromagnetic tracking involves determining the position and orientation of an electromagnetic receiver relative to an electromagnetic source. An electromagnetic source generates an electromagnetic field within a platform (e.g., the cockpit of an airplane). The electromagnetic source includes at least one electromagnetic coil that transmits an electromagnetic field. For example, the electromagnetic source may include three mutually perpendicular transmitting coils, each defining a respective axis. An electromagnetic receiver unit on the tracked object (e.g., the helmet of the pilot) measures the generated electromagnetic field. The electromagnetic receiver unit includes at least one sensor (e.g., three) that measures values associated with the electromagnetic field. Each sensor includes at least one electromagnetic coil that receives an electromagnetic field. For example, each sensor may include three mutually perpendicular receiving coils, each defining a respective axis. The electromagnetic source generates a unique electromagnetic field, in the sense that each point in the motion platform has a unique measurable quantity associated with the electromagnetic field (e.g., the electromagnetic field strength as a vector quantity). The position and orientation of the sensor is obtained by analyzing and comparing the electromagnetic field generated by the transmitting coils and the electromagnetic field measured by the receiving coils.

One approach for EM tracking is based on using a mathematical model of the generated electromagnetic field. The mathematical model is characterized by a set of model parameters, with one set for each transmitting coil. The model predicts the electromagnetic field value (i.e., the measurable quantity associated with the electromagnetic field) at each point within the platform. The EM tracker solves for the position and orientation at which the electromagnetic field values predicted by the mathematical model of the electromagnetic field best match the field values measured by the receiving coils.

A cost function defines the difference between the measured EM field and the model. By minimizing the cost function using a best-fit algorithm, the EM tracker finds the closest match between the model of the EM field and the measured EM field. Noise and other factors influence the final result.

The calculation of position and orientation in EM tracking in this manner necessitates two requirements. The first requirement is that the EM tracker possesses an accurate model of the EM field transmitted by the electromagnetic source, for every point within the platform. It is noted that there are a number of methods known in the art for obtaining all the necessary model parameters, such as analytical modeling (as described in F. Raab, E. Blood, T. Steiner and H. Jones, *"Magnetic Position and Orientation Tracking System"*, IEEE Transactions on Aerospace and Electronic Systems, 1979, Vol. AES-15, No. 5, pp. 709-717; and U.S. Pat. No. 3,868,565 to Kuipers, entitled "Object Tracking and Orientation Determination means, System and Process"), and adaptive modeling (as described in US Patent Application No. 2004/0034515 A1 to Bar Tal et al, entitled "Estimating Position and Orientation in Electromagnetic Systems"). The second requirement is that the EM tracker possesses an accurate model of the receiving coils (i.e., size, shape, and other physical parameters of the coils). This model is a rigid structure characterized by the vector position of each sensor in the electromagnetic receiver unit, and the calibration parameters of each sensor.

Several EM trackers suffer from latency. Typically, in order to reduce the noise in the EM field measurements, a large number of previous measurements are averaged. This procedure results in a substantial delay, or latency, between the position and orientation determined by the EM tracker, and the actual current position and orientation of the tracked object.

It is noted that EM tracking is a special case of the broader category of non-inertial tracking. Other forms of non-inertial tracking, such as optical, acoustic, or radio frequency (RF), involve generating and receiving some form of energy or signal (i.e., light waves, sound waves, or radio frequencies, respectively).

Non-inertial trackers may be influenced by external factors in the platform environment. For example, EM trackers may be influenced by electrical or magnetic objects in the environment, which can interfere with the electromagnetic field generated by the electromagnetic source, or with the electromagnetic field received by the electromagnetic receiver unit. Another example involves optical trackers, where objects near the tracked object may block a direct line-of-sight from a sensor to a transmitter, and prevent the sensor from receiving the transmitted optical signal. These types of interference may result in limitations for the environment in which non-inertial tracking is implemented.

U.S. Pat. No. 5,645,077 to Foxlin entitled "Inertial Orientation Tracker Apparatus Having Automatic Drift Compensation for Tracking Human Head and Other Similarly Sized Body", is directed to an inertial angular orientation tracking apparatus which utilizes additional sensors for drift correction. A tracking device includes a set of drift sensitive sensors, a set of drift compensating sensors, an integration module, and a drift compensation module. The drift sensitive sensors are typically angular rate sensors, such as rate gyroscopes, and are subject to drift over time. The drift compensating sensors are angular position sensors, typically inclinometers and compasses, and are relatively impervious to drift over time. The angular rate sensors and drift compensating sensors are mounted upon a human body member, such as a head. The angular rate sensors and drift compensating sensors are impervious to interference from electromagnetic, acoustic, optical and mechanical sources.

The set of angular rate sensors generate signals corresponding to the rate of change of the angular orientation of the individual sensors. The integration module integrates the signals, to provide a set of orientation angles. The set of drift compensating sensors generate an angular position signal related to the angular orientation of the body member to which the sensors are attached. The angular position signal is provided to the drift compensation module. The drift compensation module uses the angular position signal to generate a signal representing the angular orientation corrected for errors in the angular orientation provided by the integration module. These errors may arise due to drift. Drift results from integrating over time a signal which is noisy or has a bias. Drift would make the virtual world appear to gradually rotate about the head of the user even when the user is not moving. The corrected angular orientation signal is provided as output to external equipment, such as a virtual reality system, a computer, or a teleoperator.

The drift compensating module may include a verifier that periodically measures the orientation of the body member, by a means different from the angular rate sensors. The verifier generates an orientation drift compensation signal based on the verification measurement, to reduce the effect of drift. The verifier may take into account characteristic features of human motion, such as stillness periods. The drift compensating module may be implemented using a Kalman filter, which may utilize statistical data about human head motion.

U.S. Pat. No. 6,409,687 to Foxlin entitled "Motion Tracking System", is directed to an inertial motion tracking apparatus which utilizes acoustic measurements for drift correction. A tracking device includes an Inertial Measurement Unit (IMU), an array of three Ultrasonic Range Measurement (URM) Units, and a processor. The processor is coupled the IMU and the URMs. The tracking device may be fixed on the head of an operator, such as to a Head-Up Display (HUD).

The IMU includes three angular rate sensors and three linear acceleration sensors. The sensors are arranged along three orthogonal axes that are fixed in the reference frame of the tracking device. Each acceleration sensor provides a signal proportional to the acceleration along the corresponding axis. Each angular rate sensor provides a signal proportional to the rotation rate about the corresponding axis. The processor determines the position and orientation of the tracking device using the inertial measurements received from the IMU.

An ultrasonic beacon array includes a plurality of ultrasonic beacons at fixed locations on the environment, such as arranged on the ceiling of the room in a regular pattern. The URM receives acoustic signals sent by the ultrasonic beacons. The processor estimates a range measurement relating to the distance between the beacons and the tracking device, using the received signals along with the known three-dimensional location of the beacons. The processor updates the position and orientation of the tracking device using the range measurements.

Each ultrasound beacon sends an acoustic pulse to the URMs. Each URM broadcasts infrared (IR) signals to all the ultrasonic beacons. The IR signals include address information, so that only a selected number of ultrasound beacons respond. In response to an IR signal, the intended ultrasonic beacons immediately send acoustic pulses, which are received by one or more URMs. The processor determines the time of flight, by measuring the delay from issuing the IR command to detecting the ultrasonic pulse. The range measurement may be based on the time of flight.

The tracking device combines measurements from both measurement modes, and adjusts its estimates of position and orientation to reflect measurements from both modes as they are available. The processor may implement an extended Kalman Filter to combine the measurements and maintain ongoing estimates of the position and orientation of the tracking device, along with the degree of uncertainty of these estimates.

The tracking device continues using inertial measurements when acoustic measurements are unavailable, such as due to occlusion of the beams. Drift correction is then made once the acoustic measurements become available.

U.S. Pat. No. 6,474,159 to Foxlin et al. entitled "Motion-Tracking", is directed to an inertial tracker for tracking motion relative to a moving platform. An inertial head-tracking system on board a moving platform includes a tracking Inertial Measurement Unit (IMU), a reference IMU, and a processor unit. The tracking IMU is mounted on the tracked object. The reference IMU is mounted on the moving platform, such as on an external X-bar fixed to the environment (e.g., the canopy of the simulator cab or the cockpit).

Each of the reference IMU and the tracking IMU may include three angular inertial sensors having angular rate sensors. The processor unit receives signals from the tracking IMU and the reference IMU, and determines the orientation of the object relative to the moving platform. In particular, the processor unit computes the orientation of the object with respect to a fixed inertial reference frame using the signals from the tracking IMU. The processor unit further computes the orientation of the moving platform with respect to the same fixed inertial reference frame using the signals from the reference IMU. Based on these two orientations, the processor unit then computes the orientation of the object relative to the moving platform. The orientation relative to a given reference frame is determined by integrating a relative angular rate signal measured by the IMU.

A non-inertial tracking subsystem may make independent measurements of the orientation of the object relative to the moving reference frame. The inertial head-tracking system may use these measurements to correct for any drift that may occur in the inertial orientation integration. The non-inertial tracking subsystem may use optical, acoustic, magnetic, radio frequency, or electromagnetic technologies.

Each of the reference IMU and the tracking IMU may further include three linear accelerometers. The processor unit may further determine the position of the object relative to the moving platform, using signals from the tracking IMU and the reference IMU. In particular, the processor unit computes the position of the object with respect to a fixed inertial reference frame using the signals from the tracking IMU. The processor unit further computes the position of the moving platform with respect to the same fixed inertial reference frame using the signals from the reference IMU. Based on these two positions, the processor unit then computes the position of the object relative to the moving platform. The position relative to a given reference frame is determined by double-integrating a relative linear acceleration signal measured by the IMU.

The calculation of the linear acceleration signal may include compensation for tangential, Coriolis, and centripetal acceleration effects caused by the angular velocity and angular acceleration of the moving platform. The non-inertial tracking subsystem may further make independent measurements of the position of the object relative to the moving reference frame. The inertial head-tracking system may then use these measurements to correct for any drift that may occur in the inertial position integration.

US Patent Application No. 2004/0073360 A1 to Foxlin entitled "Tracking, auto-calibration, and map-building system", is directed to a method and system for navigating a vehicle in a certain environment. The navigation system builds a map of the environment, calibrates the sensors, and determines the location of the vehicle in the environment frame of reference. A navigation system includes sensors and a data processing unit. The sensors provide measurement data. The data processing unit processes the data provided by the sensors.

The system includes a sensor subsystem and an estimation subsystem coupled thereto. The sensor subsystem includes inertial sensors and sensing devices or targets. The sensing devices or targets, referred to as Pose Sensing Elements (PSEs), may be in the vehicle (referred to as "mobile PSE"), or fixed in the environment (referred to as "fixed PSE"). The inertial sensors provide inertial measurements to the navigation system. The PSEs provide sensor measurements, which are measurements between elements in the vehicle and elements external to the vehicle. Sensor measurements relate to measurements between a mobile PSE and a fixed PSE, and depend on aspects of the relative pose of the two PSEs.

The estimation subsystem accepts configuration data and measurement information from the sensor subsystem. The measurement information relates to the relative position and orientation of sensing elements. The configuration data enables selective performance of different functions for the estimation subsystem. The estimation subsystem repeatedly updates a state estimate, which characterizes an estimate of the location of the vehicle, according to the accepted measurement data and configuration data. The state estimate may be an estimate of the position or orientation of the vehicle relative to the environment, the position and orientation, relative to the vehicle, of a sensing device fixed to the vehicle, or the position and orientation, relative to the environment, of a sensing device fixed in the environment. Updating the state estimate may be performed using a Kalman filter.

SUMMARY OF THE DISCLOSED TECHNIQUE

In accordance with the disclosed technique, there is thus provided an apparatus for determining the position of a selected object relative to a moving reference frame. The apparatus includes at least one reference frame transceiver assembly firmly attached to the moving reference frame, at least one object transceiver assembly firmly attached to the selected object, an inertial measurement unit (IMU) firmly attached to the selected object, an inertial navigation system (INS) firmly attached to the moving reference frame, and a tracking processor coupled with the object transceiver assembly, with the inertial measurement unit and with the inertial navigation system. The object transceiver assembly communicates with the reference frame transceiver assembly using magnetic fields. The IMU produces IMU inertial measurements of motion of the selected object with respect to an inertially fixed reference frame. The INS produces INS inertial measurements of motion of the moving reference frame with respect to the inertially fixed reference frame. The tracking processor receives electromagnetic measurements resulting from the magnetic communication between the reference frame transceiver assembly and the object transceiver assembly. The tracking processor determines the position of the selected object relative to the moving reference frame by using the IMU inertial measurements and the INS inertial measurements to optimize the electromagnetic measurements.

The apparatus may further include a transmitter interface coupled with the reference frame transceiver assembly, and a sensor interface coupled with the object transceiver assembly. The transmitter interface generates a digital signal representing the characteristics of a magnetic field to be transmitted. The sensor interface receives the electromagnetic measurements from the object transceiver assembly and provides the electromagnetic measurements to the tracking processor.

In accordance with the disclosed technique, there is further provided a method for determining the position of a selected object relative to a moving reference frame. The method includes the procedure of communicating using magnetic fields. The method further includes the procedures of producing IMU inertial measurements of motion of the selected object with respect to an inertially fixed reference frame, and producing INS inertial measurements of motion of the moving reference frame with respect to the inertially fixed reference frame. The method further includes the procedures of receiving electromagnetic measurements resulting from the magnetic communication, and determining the position of the selected object relative to the moving reference frame by using the IMU inertial measurements and the INS inertial measurements to optimize the electromagnetic measurements.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The disclosed technique overcomes the disadvantages of the prior art by providing a hybrid electromagnetic-inertial tracker to determine the position of a selected object relative to a moving reference frame. The hybrid tracker obtains both EM measurements and inertial measurements. The hybrid tracker utilizes the raw inertial measurements to optimize the position and orientation obtained from the EM measurements, thereby improving the accuracy and stability of the tracking system.

Trackers are characterized by the number of degrees of freedom (DOF) tracked. The general case deals with six DOF, consisting of the position and orientation of the object in three-dimensional space. The location of the tracked object is characterized by the three-dimensional coordinates of a reference point fixed in the object, with respect to a coordinate system fixed in the platform under consideration. The orientation of the tracked object is specified as a set of angles, typically the modern Euler angles (i.e., azimuth, elevation, and roll; alternately known as pitch, yaw, and roll) which characterize the rotation of the tracked object with respect to the aforementioned coordinate system. Location is denoted as $\vec{r}$, and orientation is denoted as $\tilde{R}$, herein below. The term "position" herein below, refers either to the location, to the orientation, or both the location and the orientation, of an object in a three-dimensional coordinate system.

It is noted that the disclosed technique is applicable to the tracking of any type of object relative to any particular platform (i.e., a moving reference frame). For example, the tracked object may be a medical probe relative to a human body, the helmet of a pilot relative to the cockpit of an aircraft, the helmet of a tank crew member relative to the inside of a tank, a selected body part of a person relative to a room, and the like. The following includes a description of the disclosed technique used in conjunction with tracking the helmet of a pilot relative to the cockpit of an aircraft.

Figure 1:
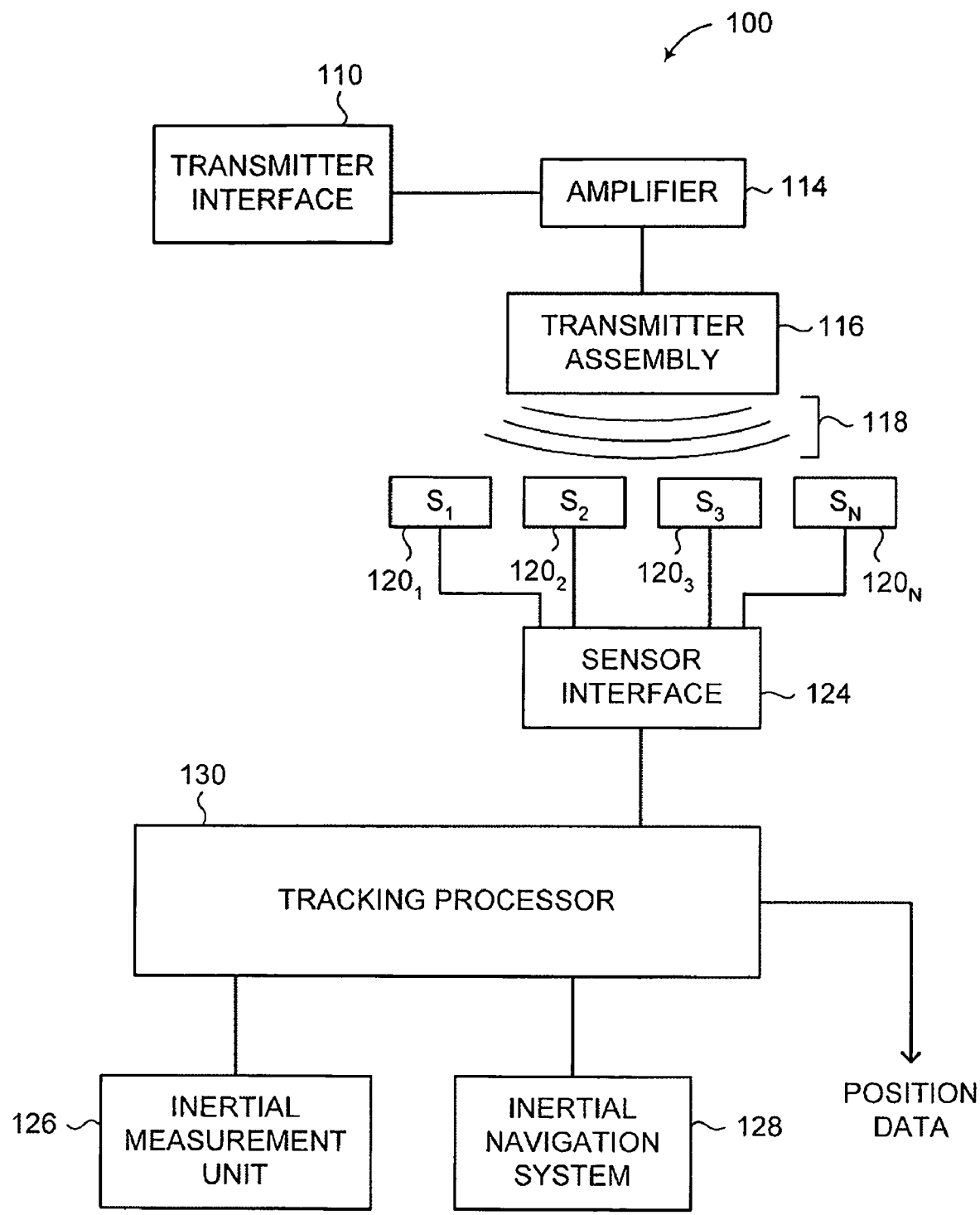
FIG. 1 is a schematic illustration of a hybrid tracker, constructed and operative in accordance with an embodiment of the disclosed technique.

Reference is now made to FIG. 1, which is a schematic illustration of a hybrid tracker, generally referenced 100, constructed and operative in accordance with an embodiment of the disclosed technique. Hybrid tracker 100 includes a transmitter interface 110, an amplifier 114, at least one transmitter assembly 116, a plurality of sensor assemblies $120_1$, $120_2$, $120_3$ and $120_N$ (denoted $S_1$, $S_2$, $S_3$ and $S_N$, respectively, in FIG. 1), a sensor interface 124, an inertial measurement unit (IMU) 126, an inertial navigation system (INS) 128, and a tracking processor 130.

Transmitter interface 110 is coupled with amplifier 114. Amplifier 114 is further coupled with transmitter assembly 116. Sensor assemblies $120_1$, $120_2$, $120_3$ and $120_N$ are coupled with sensor interface 124. Tracking processor 130 is coupled with sensor interface 124, with IMU 126, and with INS 128.

Transmitter assembly 116 includes at least one transmitting coil (not shown), for transmitting a magnetic field. For example, transmitter assembly 116 may include three mutually perpendicular transmitting coils, each defining a respective spatial axis. It is noted that hybrid tracker 100 may also include several transmitter assemblies. More generally, transmitter assembly 116 may be a reference frame transceiver assembly, which can either transmit a magnetic field or receive a magnetic field.

Each of sensor assemblies $120_1$, $120_2$, $120_3$ and $120_N$ includes at least one receiving coil (not shown), for receiving a magnetic field. For example, each of sensor assemblies $120_1$, $120_2$, $120_3$ and $120_N$ may include three mutually perpendicular receiving coils, each defining a respective spatial axis. More generally, sensor assemblies $120_1$, $120_2$, $120_3$ and $120_N$ may be an object transceiver assembly, which can either transmit a magnetic field or receive a magnetic field. Each of sensor assemblies $120_1$, $120_2$, $120_3$ and $120_N$ are mounted on a selected object to be tracked (e.g., the helmet of a pilot), while transmitter assembly 116 is fixed at a general location within the platform (i.e., the cockpit). Alternatively, transmitter assembly 116 is mounted on the tracked object, and sensor assemblies $120_1$, $120_2$, $120_3$ and $120_N$ are fixed at a general location within the platform. The following description of the disclosed technique uses the example that hybrid tracker 100 includes a single sensor assembly (herein denoted sensor assembly $120_1$), which is firmly attached to the tracked object, and a transmitter assembly 116 which is firmly attached to the platform.

Transmitter interface 110 generates a digital signal representing the characteristics of a magnetic field to be transmitted. For example, the digital signal may be a mathematical function comprised of several different individual frequencies, each at different amplitudes. Alternatively, the digital signal may be any generalized waveform that indicates the characteristics of the magnetic field to be transmitted. The digital signal may be predetermined, or calculated in accordance with real-time properties of hybrid tracker 100. Transmitter interface 110 provides the digital signal to amplifier 114 via a digital to analog converter (not shown), which converts the digital signal to a set of analog signals. Each analog signal may be respective of a different spatial axis. Amplifier 114 amplifies the respective analog signals and provides the amplified signals to transmitter assembly 116.

Transmitter assembly 116 receives the amplified analog signals and generates a set of magnetic fields. Due to the different spatial orientation of each transmitting coil, transmitter assembly 116 transmits a number of different magnetic fields. In addition, each transmitting coil in transmitter assembly 116 generates a magnetic field oscillating at a different frequency. For example, transmitter assembly 116 transmits at least two magnetic fields (i.e., each magnetic field having three components), in order to achieve sufficient mathematical observability of the parameters of the magnetic field model and the receiving coil calibration parameters (described further below), thereby allowing the object to be accurately tracked. Magnetic field 118 is the superposition of the individual magnetic fields generated by each transmitting coil of transmitter assembly 116, where each generated magnetic field is at a different frequency. Transmitter assembly 116 thereby generates a multiple-component, multiple-frequency magnetic field 118 throughout the platform. Magnetic field 118 is unique in the sense that every point within the platform has a unique measurable quantity. For example, the unique measurable quantity may be the magnetic field vector at each point. Typically, magnetic field 118 includes frequencies on the order of tens of kilohertz.

Magnetic field 118 results in a voltage difference in the receiving coils of sensor assembly $120_1$, as a result of EM induction. In each receiving coil, the induced voltage is proportional to the magnitude of the magnetic field perpendicular to that receiving coil. Sensor assembly $120_1$ uses the induced voltage in the receiving coils to measure the local magnetic field vector of magnetic field 118. The measurement of magnetic field 118 is herein below referred to as an "EM measurement". Sensor assembly $120_1$ produces a respective analog signal corresponding to the EM measurement in that sensor assembly, and provides the analog signal to sensor interface 124 via an analog to digital converter (not shown), which converts the analog signal to a digital signal. Sensor interface 124 provides the received digital signal of the EM measurement, denoted as $\vec{F}_{i,j,k}^{measured}$, to tracking processor 130.

IMU 126 is mounted on the object to be tracked (e.g., the helmet of a pilot). IMU 126 measures all three components of the angular velocity $\vec{\omega}$ of the object, and all three components of the linear acceleration $\vec{a}$ of the object. The measurements of $\vec{a}$ and $\vec{\omega}$ are taken relative to an inertially fixed reference frame. IMU 126 may be implemented with gyroscopes for measuring the angular velocity $\vec{\omega}$, and accelerometers for measuring the linear acceleration $\vec{a}$. For example, IMU 126 includes three gyroscopes (i.e., one for each spatial axis) and three accelerometers (i.e., one for each spatial axis). If for example the motion of the tracked object is restricted to one degree of freedom, then IMU 126 may measure angular velocity and acceleration with respect to a single spatial axis, using one gyroscope and one accelerometer. IMU 126 provides the measurements of $\vec{a}$ and $\vec{\omega}$ to tracking processor 130. The measurements of $\vec{a}$ and $\vec{\omega}$ are herein referred to as "IMU inertial measurements".

INS 128 is mounted on a moving platform (e.g., the aircraft cockpit), in which the tracked object is present. INS 128 measures all three components of the angular velocity $\vec{\omega}^{platform}$ of the moving platform relative to the inertially fixed reference frame, and all three components of the linear acceleration $\vec{a}^{platform}$ of the moving platform relative to the inertially fixed reference frame. INS 128 may be implemented with gyroscopes for measuring the angular velocity $\vec{\omega}^{platform}$, and accelerometers for measuring the linear acceleration $\vec{a}^{platform}$. For example, INS 128 includes three gyroscopes (i.e., one for each spatial axis) and three accelerometers (i.e., one for each spatial axis). If for example the motion of the tracked object is restricted to one degree of freedom, then INS 128 may measure angular velocity and acceleration with respect to a single spatial axis, using one gyroscope and one accelerometer. INS 128 provides the measurements of $\vec{\omega}^{platform}$ and $\vec{a}^{platform}$ to tracking processor 130. The measurements of $\vec{a}^{platform}$ and $\vec{\omega}^{platform}$ are herein referred to as "INS inertial measurements". The IMU inertial measurements and INS inertial measurements are collectively referred to as "inertial measurements" herein below. It is noted that IMU 126 and INS 128 are identical elements, in that both measure angular velocity and linear acceleration. However in practice, IMU 126 and INS 128 may have different accuracy, weight, cost, hardware, or other factors associated therewith.

Tracking processor 130 receives as input data $\vec{F}_{i,j,k}^{measured}$ from sensor interface 124, as well as $\vec{a}$ and $\vec{\omega}$ from IMU 126 and $\vec{\omega}^{platform}$ and $\vec{a}^{platform}$ from INS 128. Tracking processor 130 determines the position and orientation of the pilot helmet by using the inertial measurements to optimize the electromagnetic measurements, as described further with reference to FIGS. 2-4.

Hybrid tracker 100 has several requirements. The first requirement is an accurate model of the magnetic field generated by transmitter assembly 116, denoted $\vec{F}^{emModel}$, for every point within the cockpit. The model $\vec{F}^{emModel}$ is characterized by a set of model parameters $h_i^{em}$, one for each transmitting coil of transmitter assembly 116. The model $\vec{F}^{emModel}$ predicts the field at each point $\vec{r}$ in the cockpit. Another requirement for hybrid tracker 100 is an accurate model of the receiving coils of sensor assembly $120_1$. This model is characterized by the vector position $\vec{d}_k$ of sensor assembly $120_1$, and the calibration parameters $c_{k,j}^{em}$ of sensor assembly $120_1$. A further requirement for hybrid tracker 100 is having calibration parameters $c^{inertial}$ of IMU 126, to correct for bias, scale factor, and non-orthogonality. It is noted that calibration parameters are also required for INS 128, although in practice, INS 128 is an independent self-contained system and provides data that is already calibrated. Yet another requirement for hybrid tracker 100 involves estimates of noise in the EM measurements and inertial measurements. The noise in the $k^{th}$ sensor assembly is denoted $\sigma_k^2$, the noise in the inertial estimate of position is denoted $\sigma_{inertial-pos}^2$, and the noise in the inertial estimate of orientation is denoted $\sigma_{inertial-ang}^2$.

It is noted that several of the required parameters, such as calibration parameters $c_{k,j}^{em}$ and $c^{inertial}$, may change over time (e.g., due to temperature, aging, stress, and the like), and hybrid tracker 100 may not possess an accurate enough model of these changes. Furthermore, the actual magnetic field in the platform may drift from its modeled value $\vec{F}^{emModel}$. However, as long as these changes vary at a relatively slow rate, or change abruptly but remain fixed afterwards, the changes can be corrected using techniques known in the art, such as Kalman filters. For example, assuming that calibration parameters $c_{k,j}^{em}$ and $c^{inertial}$ are constant but different from their current values, hybrid tracker 100 may find the values of $\delta c_{k,j}^{em}$ and $\delta c^{inertial}$ that best describe a "batch" of samples. Another example involves calculating optimal values of the model parameters $h_i^{em}$ by a process known as "adaptation", which is described herein below in FIG. 5.

Figure 2:
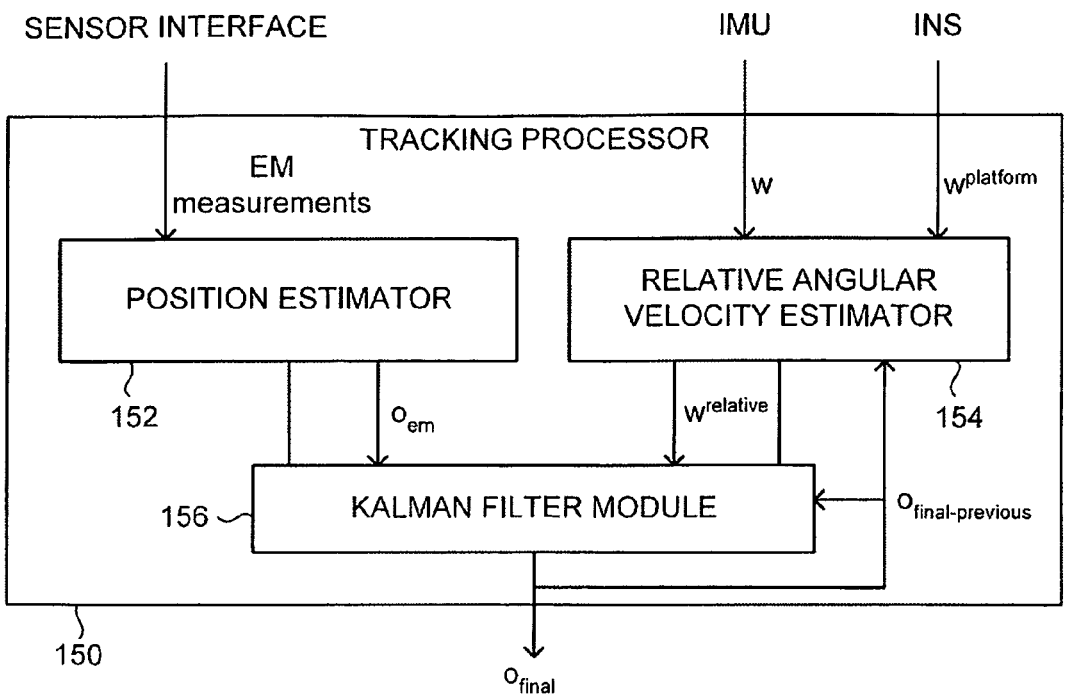
FIG. 2 is a schematic illustration of a tracking processor, constructed and operative in accordance with an embodiment of the disclosed technique.

Reference is now made to FIG. 2, which is a schematic illustration of a tracking processor, generally referenced 150, constructed and operative in accordance with an embodiment of the disclosed technique. Tracking processor 150 is interchangeable with tracking processor 130 of FIG. 1. In the embodiment of FIG. 2, tracking processor 150 determines an optimized orientation value by combining EM measurements with a relative angular velocity obtained from inertial measurements.

Tracking processor 150 includes a position estimator 152, a relative angular velocity estimator 154, and a Kalman filter module 156. Kalman filter module 156 is coupled with position estimator 152 and with relative angular velocity estimator 154.

In the embodiment of FIG. 2, tracking processor 150 receives EM measurements from sensor interface 124, and inertial measurements from IMU 126, and from INS 128.

Position estimator 152 estimates the location and orientation ($\vec{p}_{em}$ and $\vec{o}_{em}$) of sensor assembly $120_1$ based on the received EM measurements using EM tracking, as is known in the art. Relative angular velocity estimator 154 estimates the relative angular velocity $\vec{\omega}^{relative}$ between IMU 126 and INS 128, by subtracting the angular velocity measurements $\vec{\omega}$ and $\vec{\omega}^{platform}$. The relative angular velocity $\vec{\omega}^{relative}$ represents the angular velocity of the object with respect to the moving platform. Kalman filter module 156 integrates relative angular velocity $\vec{\omega}^{relative}$, to obtain an inertial based orientation estimate, by the following equation:

$$\vec{o}_{inertial} = \vec{o}_{final-previous} + \vec{\omega}^{relative} \cdot \Delta t \qquad (1)$$

where $\vec{o}_{final-previous}$ is the orientation value determined by Kalman Filter module 156 in the previous time-step. Equation (1) involves integrating over a single time-step, rather than continuously integrating over multiple time-steps.

Kalman filter module 156 receives the EM based orientation estimate $\vec{o}_{em}$, from position estimator 152. Kalman filter module 156 determines a final orientation value $\vec{o}_{final}$ of the tracked object, using the following equation:

$$\vec{o}_{final} = \vec{o}_{final-previous} + K(\vec{o}_{em} - \vec{o}_{inertial}) \qquad (2)$$

where K is a weighting factor that quantifies the level of confidence of the two types of estimates with respect to one another. By changing the value of K, the weight given to each of the two types of estimates can be varied as a function of the quality of the particular estimate. For example, if the accuracy of the EM components of hybrid tracker 100 becomes degraded for a certain period of time, then the inertial based orientation estimate $\vec{o}_{inertial}$ may be given a higher weight than the EM based orientation estimate $\vec{o}_{em}$ during this period. As a result, the accuracy of final orientation value $\vec{o}_{final}$ is less influenced by the degradation of the EM components of hybrid tracker 100.

Kalman filter module 156 feeds back the final orientation value $\vec{o}_{final}$ to relative angular velocity estimator 154. Relative angular velocity estimator 154 uses the final orientation value from the previous time-step $\vec{o}_{final-previous}$ in order to properly subtract the angular velocity measurements $\vec{\omega}$ and $\vec{\omega}^{platform}$.

It is noted that the location estimate may also be filtered, if desired, by double integrating a relative acceleration value, obtained from the linear acceleration measurements a from IMU 126, and $\vec{a}^{platform}$ from INS 128. Hybrid tracker 100 is primarily concerned with the measurement of orientation, and therefore for the sake of simplicity, only the orientation measurement is discussed herein below. However, it is appreciated that analogous techniques may be applied with regard to location (e.g., by substituting linear acceleration measurements from the inertial components for angular velocity measurements and performing a double integration instead of a single integration).

It is further noted that hybrid tracker 100 utilizes inertial measurements to reduce noise in the EM measurements, which does not result in any additional latency between the location and orientation determined by tracking processor 150, and the actual current position and orientation. This feature is also applicable to the embodiments of FIGS. 3 and 4.

Figure 3:
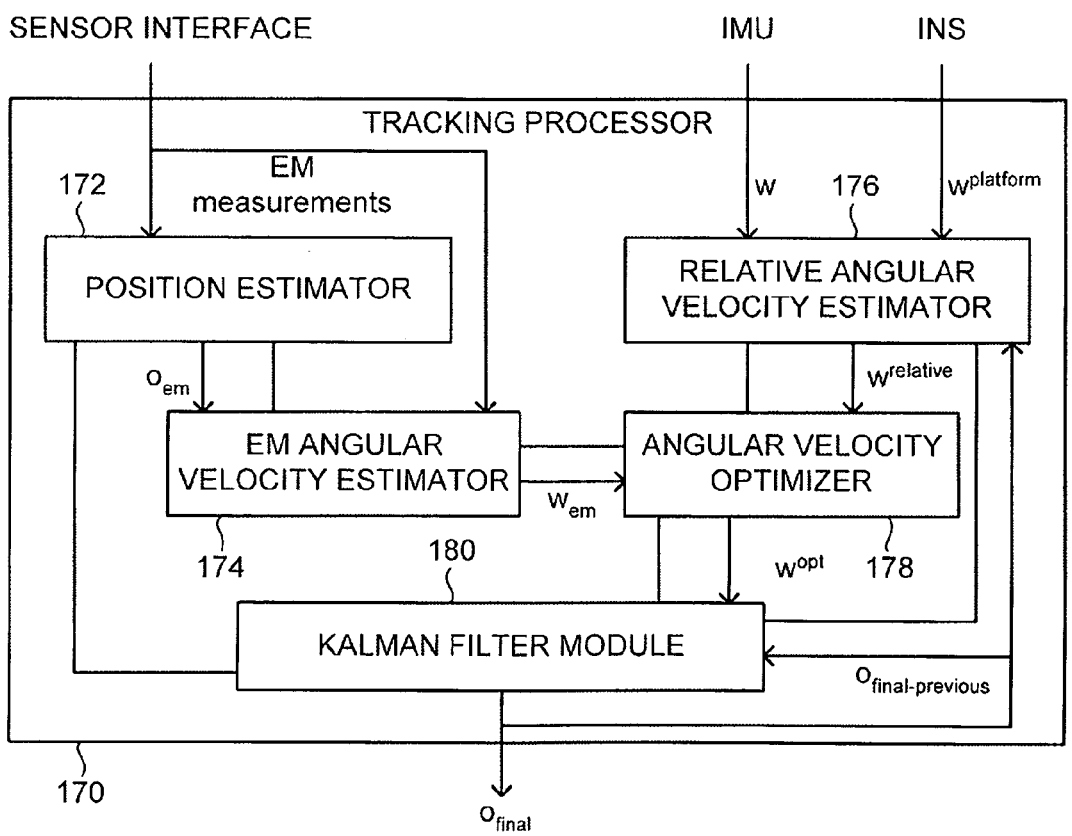
FIG. 3 is a schematic illustration of a tracking processor, constructed and operative in accordance with another embodiment of the disclosed technique.

Reference is now made to FIG. 3, which is a schematic illustration of a tracking processor, generally referenced 170, constructed and operative in accordance with another embodiment of the disclosed technique. Tracking processor 170 is interchangeable with tracking processor 130 of FIG. 1. In the embodiment of FIG. 3, hybrid tracker 100 determines an optimized orientation value based on both EM measurements and inertial measurements. Tracking processor 170 uses data from the EM components of hybrid tracker 100, together with the inertial measurements, to obtain an optimally weighted angular velocity, which is then combined with the EM measurements to obtain a final orientation value.

Tracking processor 170 includes a position estimator 172, an EM angular velocity estimator 174, a relative angular velocity estimator 176, an angular velocity optimizer 178, and a Kalman filter module 180. Kalman filter module 180 is coupled with position estimator 172, with relative angular velocity estimator 176, and with angular velocity optimizer 178. Relative angular velocity estimator 176 is coupled with angular velocity optimizer 178. Angular velocity optimizer 178 is further coupled with EM angular velocity estimator 174. Position estimator 172 is optionally coupled with EM angular velocity estimator 174.

Tracking processor 170 receives EM measurements from sensor interface 124, and inertial measurements from IMU 126, and from INS 128.

Position estimator 172 estimates the location and orientation ($\vec{p}_{em}$ and $\vec{o}_{em}$) of sensor assembly $120_1$ based on the received EM measurements using EM tracking, as is known in the art. EM angular velocity estimator 174 estimates an EM based angular velocity $\vec{\omega}_{em}$ based on the received EM measurements. EM angular velocity estimator 174 may use numerical differentiation of the orientation $\vec{o}_{em}$ provided by position estimator 172 (i.e., by subtraction of the orientation at successive points). Alternatively, EM angular velocity estimator 174 estimates the angular velocity directly from the received EM measurements. With reference to FIG. 1, if sensor assembly $120_1$ moves during the measurement period, the induced voltage will deviate from a pure sinusoid due to the change in magnetic flux that results from the motion of sensor assembly $120_1$. The angular velocity can be extracted from the magnetic flux measurement using signal processing methods that are known in the art.

Relative angular velocity estimator 176 estimates the relative angular velocity $\vec{\omega}^{relative}$ between IMU 126 and INS 128, by subtracting the angular velocity measurements $\vec{\omega}$ and $\vec{\omega}^{platform}$. The relative angular velocity $\vec{\omega}^{relative}$ represents the angular velocity of the object with respect to the moving platform. Angular velocity optimizer 178 optimally combines the EM based angular velocity $\vec{\omega}_{em}$ and the inertial based angular velocity $\vec{\omega}^{relative}$ to obtain a final relative angular velocity value $\vec{\omega}^{opt}$, using the following equation:

$$\vec{\omega}^{opt} = \alpha \cdot \vec{\omega}_{em} + \beta \cdot \vec{\omega}^{relative} \quad (3)$$

Kalman filter module 180 receives the optimal angular velocity value $\vec{\omega}^{opt}$ from angular velocity optimizer 178, and determines a final orientation value $\vec{o}_{final}$ of the tracked object using the following equation:

$$\vec{o}_{final} = \vec{o}_{final-previous} + \vec{\omega}^{opt} \cdot \Delta t \quad (4)$$

where $\vec{o}_{final-previous}$ is the orientation value determined by Kalman Filter module 180 in the previous time-step. Kalman filter module 180 outputs the final orientation value $\vec{o}_{final}$. Kalman filter module 180 also feeds back the final orientation value $\vec{o}_{final}$ to relative angular velocity estimator 176. Relative angular velocity estimator 176 uses the final orientation value from the previous time-step $\vec{o}_{final-previous}$ in order to properly subtract the angular velocity measurements $\vec{\omega}$ and $\vec{\omega}^{platform}$.

Angular velocity optimizer may be a Kalman Filter, operating at a different rate than Kalman Filter module 180. Alternatively, Kalman Filter module 180 performs the calculation of optimal angular velocity value $\vec{\omega}^{opt}$, instead of angular velocity optimizer 178.

Figure 4:
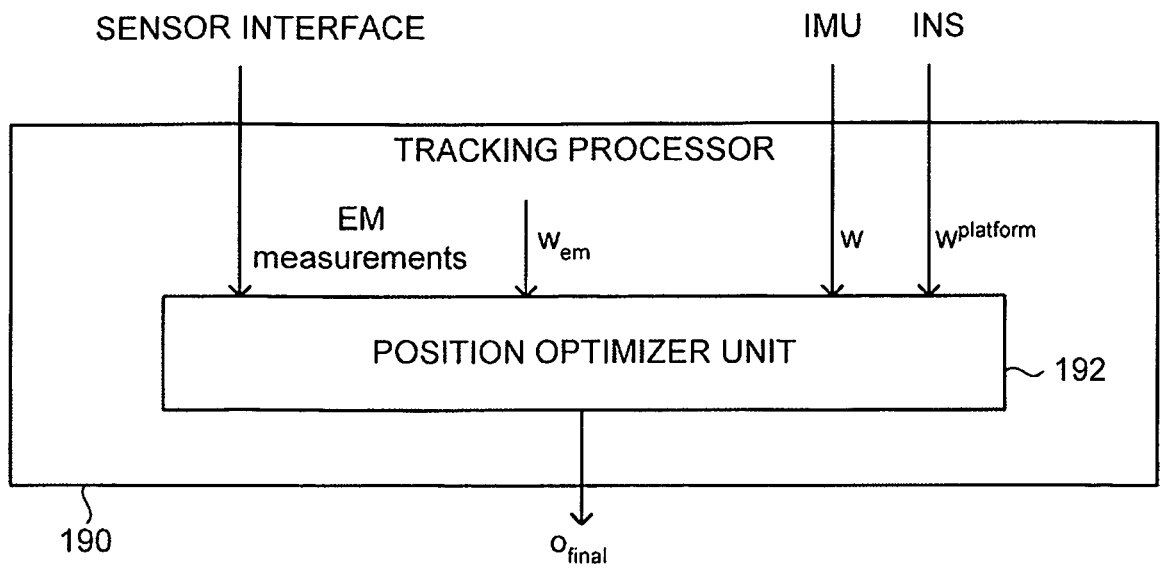
FIG. 4 is a schematic illustration of a tracking processor, constructed and operative in accordance with a further embodiment of the disclosed technique.

Reference is now made to FIG. 4, which is a schematic illustration of a tracking processor, generally referenced 190, constructed and operative in accordance with a further embodiment of the disclosed technique. Tracking processor 190 is interchangeable with tracking processor 130 of FIG. 1. In the embodiment of FIG. 4, tracking processor 190 determines an optimized orientation value by combining raw EM measurements and inertial measurements in a single step. Tracking processor 190 includes a position optimizer unit 192.

In the embodiment of FIG. 4, tracking processor 190 receives EM measurements from sensor interface 124, and inertial measurements from IMU 126, and from INS 128. Tracking processor 190 further optionally receives an EM based angular velocity estimate $\vec{\omega}_{em}$ of the tracked object from sensor interface 124.

Position optimizer unit 192 receives all the raw input data, including the EM measurements and the inertial measurements. Position optimizer unit 192 determines a final orientation value $\vec{o}_{final}$ of the tracked object by minimizing the following general cost function: $\chi^2$, defined as:

$$\chi^2(\vec{r},\vec{R}) \equiv \sum_{k=1}^{N_{sensors}} \sum_{i=1}^{N_{semsensors}} \sum_{j=1}^{N_{freq}} \frac{\|\vec{F}_{i,j,k}^{emModel} - \vec{F}_{i,j,k}^{measured}\|^2}{\sigma_k^2} + \frac{\|\vec{r} - \vec{r}^{inertialModel}\|}{\sigma_{inertial-pos}^2} + \frac{\|Angles([\vec{R}]^T \cdot \vec{R}^{inertialModel})\|^2}{\sigma_{inertial-ang}^2} \quad (5)$$

where the function Angles(U) extracts the three Euler orientation angles from an input rotation matrix:

Angles(
$\vec{R}(\Psi_{azimuth}, \Theta_{elevation}, \Phi_{roll})) \equiv (\Psi_{azimuth}, \Theta_{elevation}, \Phi_{roll})$.

Equation (5) is minimized using a non-linear minimization technique, as known in the art. Position optimizer unit 192 outputs the final orientation value $\vec{o}_{final}$.

Figure 5:
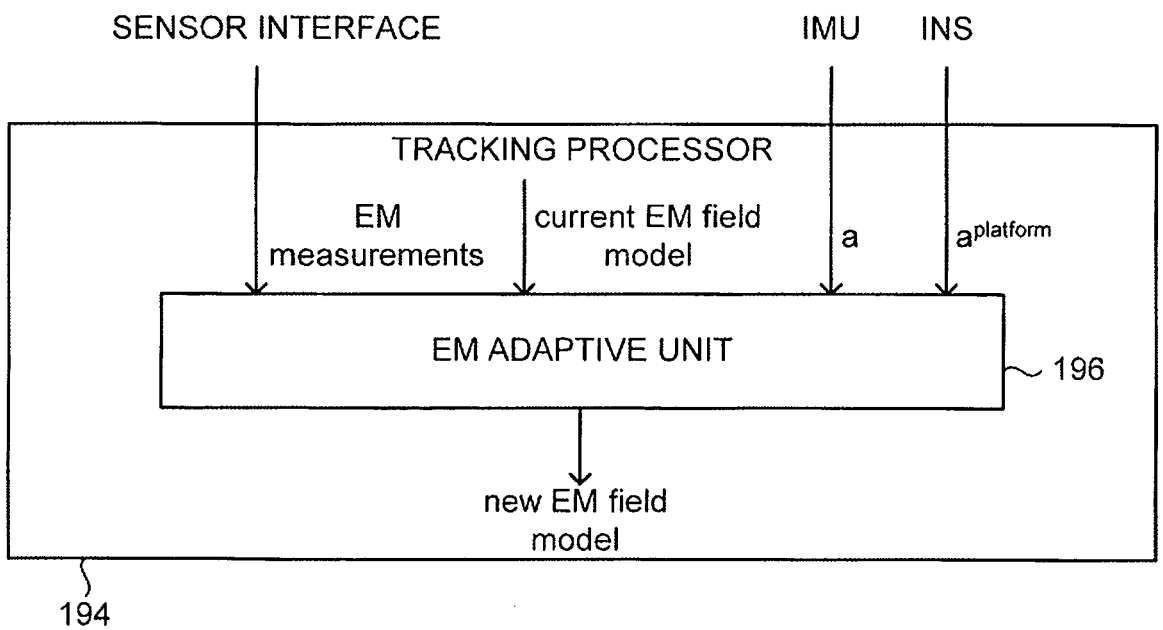
FIG. 5 is a schematic illustration of a tracking processor, constructed and operative in accordance with yet another embodiment of the disclosed technique.

Reference is now made to FIG. 5, which is a schematic illustration of a tracking processor, generally referenced 194, constructed and operative in accordance with yet another embodiment of the disclosed technique. Tracking processor 194 is interchangeable with tracking processor 130 of FIG. 1. In the embodiment of FIG. 5, tracking processor 194 uses inertial measurements to perform harmonization of an adaptive EM sub-tracker system. Tracking processor 194 includes an EM adaptive unit 196.

It is recalled that hybrid tracker 100 uses a model $\vec{F}^{emModel}$ of the magnetic field, which predicts the field value for every point in the cockpit. The model $\vec{F}^{emModel}$ may need to be updated if certain conditions occur, such as if the electromagnetic environment changes (e.g., the pilot adjusts his metallic seat or introduces a new metallic object into the cockpit), if one of the EM components of hybrid tracker 100 changes (e.g., if a component heats up, ages, or is replaced), or if the location and orientation of transmitter assembly 116 changes (e.g., if transmitter assembly 116 or any part thereof is removed and replaced). In addition to the position calculation, hybrid tracker 100 also uses model $\vec{F}^{emModel}$ for performing a self-consistency check of accuracy. During the calculation of position, hybrid tracker 100 also calculates a figure-of-merit (FOM). The FOM represents the degree of accuracy of the position calculation. In particular, the FOM is the difference between the measured magnetic field $\vec{F}_{i,j,k}^{measured}$ and the magnetic field model $\vec{F}^{emModel}$ at the best estimate of position. If the FOM is low, then the calculated position is expected to be accurate, and thus the current model $\vec{F}^{emModel}$ still accurately describes the magnetic field for the current environmental conditions. If, however, the FOM is high, then the accuracy of the calculated position is degraded, and thus the current model $\vec{F}^{emModel}$ no longer accurately describes the magnetic field for the current environmental conditions.

When a high FOM value is obtained at a sufficient number of points in the cockpit, hybrid tracker 100 develops a new model $\vec{F}^{emModel}$ of the magnetic field, in a process known as "adaptation". Following adaptation, hybrid tracker 100 possesses an accurate model $\vec{F}^{emModel}$ of the magnetic field, but lacks a fixed transformation, which is essential if the new model is to be used. This transformation is the orientation of the magnetic field model coordinate system with respect to the coordinate system of the platform (e.g., the aircraft cockpit). The process of finding this transformation is known as "harmonization".

In the embodiment of FIG. 5, hybrid tracker 100 performs harmonization using information provided by the inertial components of hybrid tracker 100. Tracking processor 194 receives multiple EM measurements and the current model $\vec{F}^{emModel}$ of the magnetic field from sensor interface 124. Tracking processor 194 further receives multiple linear acceleration measurements $\vec{a}$ of the object from IMU 126, and multiple linear acceleration measurements $\vec{a}^{platform}$ of the moving platform relative to the inertially fixed reference frame from INS 128.

EM adaptive unit 196 receives all the input data and performs harmonization using a minimization cost function. For each EM measurement, the new magnetic field model $\vec{F}^{emModel}$ provides an estimate of the orientation of the helmet in the magnetic field model coordinate system, denoted collectively as $\{O_i\}$. EM adaptive unit 196 seeks the single transformation $\tilde{H}^{harmonization}$ which minimizes the cost function:

$$\sum_i \| \tilde{O}_i \vec{a}_i \tilde{H}^{harmonization} - \vec{a}_i^{platform} \|^2 \quad (6)$$

EM adaptive unit 196 outputs the new magnetic field model $\vec{F}^{emModel}$, along with the necessary transformations, which are stored in tracking processor 194.

It is noted that the calculation performed by EM adaptive unit 196 requires that the acceleration of the moving platform changes in direction from measurement to measurement. The calculation also assumes that the acceleration of the head relative to the platform averages to zero over the entire set of measurements. This can be ensured if measurements are taken over a sufficiently long period of time, or if measurements are only taken when the head is not accelerating relative to the platform.

Figure 6:
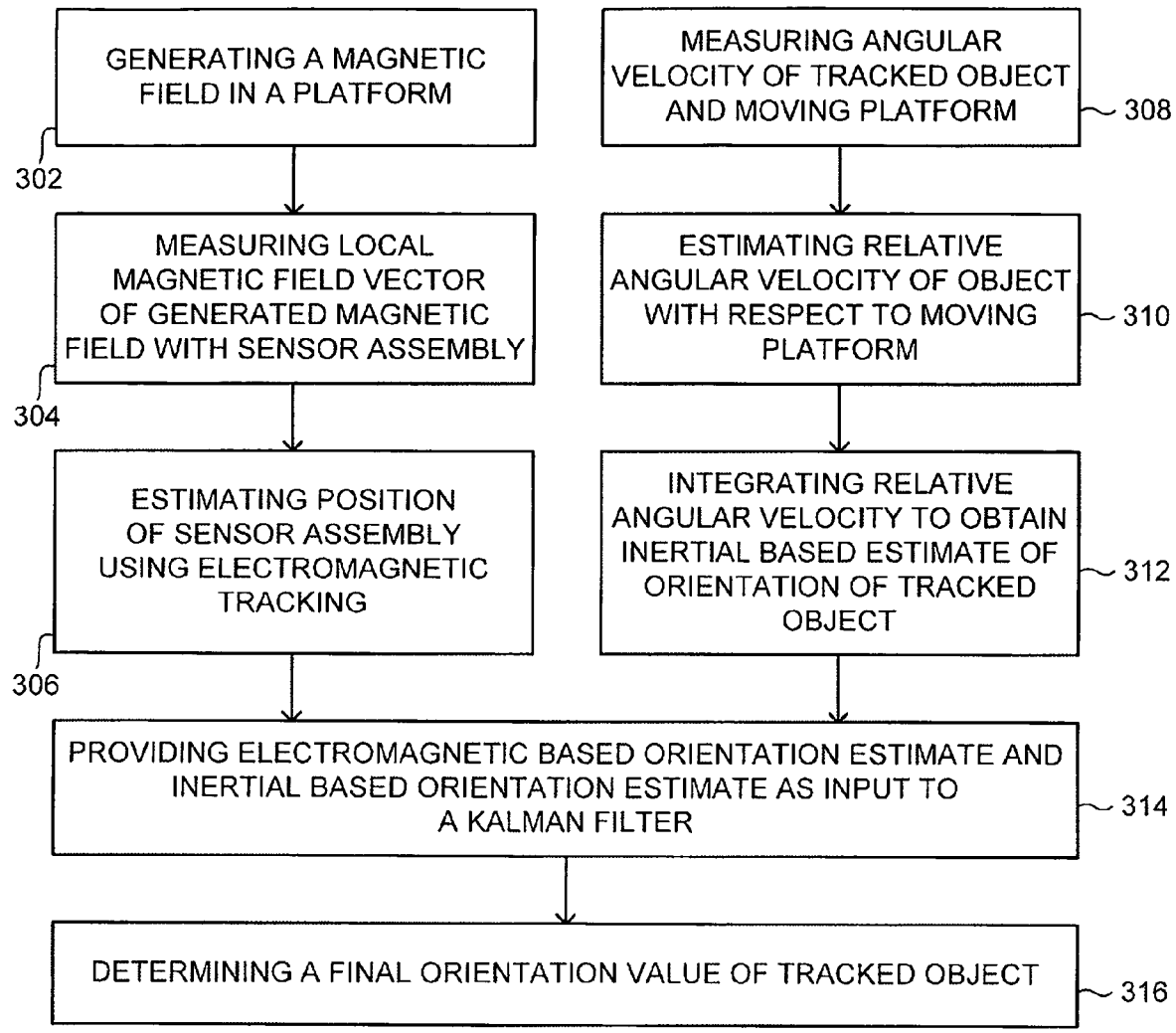
FIG. 6 is a block diagram of a method for hybrid tracking, operative in accordance with an embodiment of the disclosed technique.

Reference is now made to FIG. 6, which is a block diagram of a method for hybrid tracking, operative in accordance with an embodiment of the disclosed technique. In procedure 302, a magnetic field is generated within a platform. With reference to FIG. 1, transmitter assembly 116 generates magnetic field 118 within the cockpit, where magnetic field 118 is the superposition of individual magnetic fields each at a different amplified frequency respective of a different spatial axis.

In procedure 304, the local magnetic field vector of the generated magnetic field is measured. With reference to FIG. 1, sensor assembly 120₁ measures the local magnetic field vector of magnetic field 118 using the induced voltage in the receiving coils. In general, transmitter assembly 116 and sensor assembly 120₁ communicate using magnetic fields in procedures 302 and 304.

In procedure 306, the position of the sensor assembly is estimated, using EM tracking. With reference to FIGS. 1 and 2, position estimator 152 estimates the location and orientation ($\vec{p}_{em}$ and $\vec{o}_{em}$) of sensor assembly 120₁ (i.e., which is fixed on the tracked object) based on the measurement of magnetic field 118, using EM tracking, as is known in the art.

In procedure 308, the angular velocity of the tracked object and the angular velocity of the moving platform are measured. With reference to FIG. 1, IMU 126 measures all three components of the angular velocity $\vec{\omega}$ of the helmet, relative to an inertially fixed reference frame. In addition, INS 128 measures all three components of the angular velocity $\vec{\omega}^{platform}$ of the moving platform relative to the inertially fixed reference frame. IMU 126 and INS 128 provide the measurements of $\vec{\omega}$ and $\omega^{platform}$, respectively, to tracking processor 150.

In procedure 310, the relative angular velocity, of the object with respect to the moving platform, is estimated. With reference to FIGS. 1 and 2, relative angular velocity estimator 154 estimates the relative angular velocity $\vec{\omega}^{relative}$ between IMU 126 and INS 128, by subtracting the angular velocity measurements $\vec{\omega}$ and $\vec{\omega}^{platform}$.

In procedure 312, the relative angular velocity is integrated over a single time-step, to obtain an inertial based estimate of the orientation of the tracked object. With reference to FIGS. 1 and 2, Kalman filter module 156 integrates relative angular velocity $\vec{\omega}^{relative}$ over a single time-step, to obtain an inertial based orientation estimate $\vec{o}_{inertial}$.

In procedure 314, the EM based orientation estimate and the inertial based orientation estimate are provided, as input to a Kalman filter. With reference to FIG. 2, position estimator 152 sends EM based orientation estimate $\vec{o}_{em}$ to Kalman filter module 156, and relative angular velocity estimator 154 sends inertial based orientation estimate $\vec{o}_{inertial}$ to Kalman filter module 156.

In procedure 316, a final orientation value of the tracked object is determined. With reference to FIG. 2, Kalman filter module 156 determines a final orientation value $\vec{o}_{final}$ of the pilot helmet using Equation (2). Kalman filter module 156 outputs the final orientation value $\vec{o}_{final}$.

Figure 7:
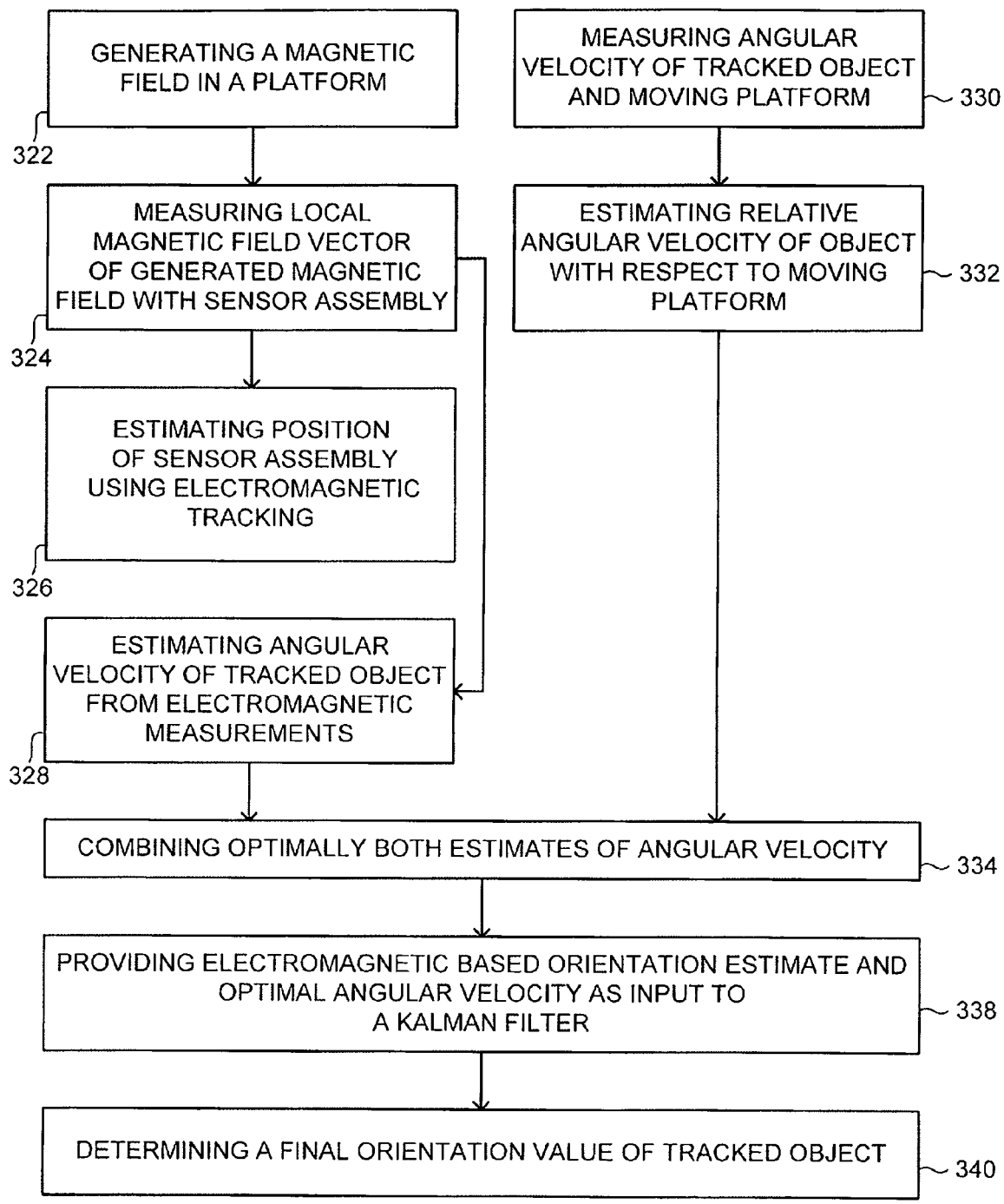
FIG. 7 is a block diagram of a method for hybrid tracking, operative in accordance with another embodiment of the disclosed technique.

Reference is now made to FIG. 7, which is a block diagram of a method for hybrid tracking, operative in accordance with another embodiment of the disclosed technique. In procedure 322, a magnetic field is generated in a platform. Procedure 322 is analogous to procedure 302 discussed with reference to FIG. 6. In procedure 324, the local magnetic field vector of the generated magnetic field is measured. Procedure 324 is analogous to procedure 304 discussed with reference to FIG. 6. In general, transmitter assembly 116 and sensor assembly 120₁ communicate using magnetic fields in procedures 322 and 324.

In procedure 326, the position of the sensor assembly is estimated using EM tracking. With reference to FIGS. 1 and 3, position estimator 172 estimates the location and orientation ($\vec{p}_{em}$ and $\vec{o}_{em}$) of sensor assembly 120₁ (i.e., which is fixed on the tracked object) based on the measurement of magnetic field 118, using EM tracking, as is known in the art. Procedure 326 is analogous to procedure 306 discussed with reference to FIG. 6.

In procedure 328, the angular velocity of the tracked object is measured from EM measurements. With reference to FIGS. 1 and 3, EM angular velocity estimator 174 estimates an EM based angular velocity $\vec{\omega}^{em}$ using EM angular velocity estimator 174 estimates the angular velocity $\vec{\omega}^{em}$ either from orientation estimate $\vec{o}_{em}$ provided by position estimator 172, or directly from EM measurements provided by sensor assembly 120₁, as discussed in FIG. 3.

In procedure 330, the angular velocity of the tracked object and the angular velocity of the moving platform are measured from inertial components. Procedure 330 is analogous to procedure 308 discussed with reference to FIG. 6. IMU 126 and INS 128 provide the measurements of $\vec{\omega}$ and $\vec{\omega}^{platform}$, respectively, to tracking processor 170.

In procedure 332, the relative angular velocity of the object with respect to the moving platform is estimated. With reference to FIGS. 1 and 3, relative angular velocity estimator 176 estimates the relative angular velocity $\vec{\omega}^{relative}$ between IMU 126 and INS 128, by subtracting the angular velocity measurements $\vec{\omega}$ and $\vec{\omega}^{platform}$.

In procedure 334, both angular velocity estimates are optimally combined. With reference to FIG. 3, angular velocity optimizer 178 optimally combines the EM based angular velocity $\omega_{em}$ and the inertial based angular velocity $\vec{\omega}^{relative}$ to obtain a final relative angular velocity value $\vec{\omega}^{opt}$, using Equation (3).

In procedure 338, the EM based orientation estimate and the optimal angular velocity are provided as input to a Kalman filter. With reference to FIG. 3, position estimator 172 sends EM based orientation estimate $\vec{o}_{em}$ to Kalman filter module 180, and angular velocity optimizer 178 sends optimal relative angular velocity $\vec{\omega}^{opt}$ to Kalman filter module 180. In procedure 340, a final orientation value of the tracked object is determined. With reference to FIG. 3, Kalman filter module 180 determines a final orientation value $\vec{o}_{final}$ of the pilot helmet, using Equation (4). Kalman filter module 180 outputs final orientation value $\vec{o}_{final}$.

Figure 8:
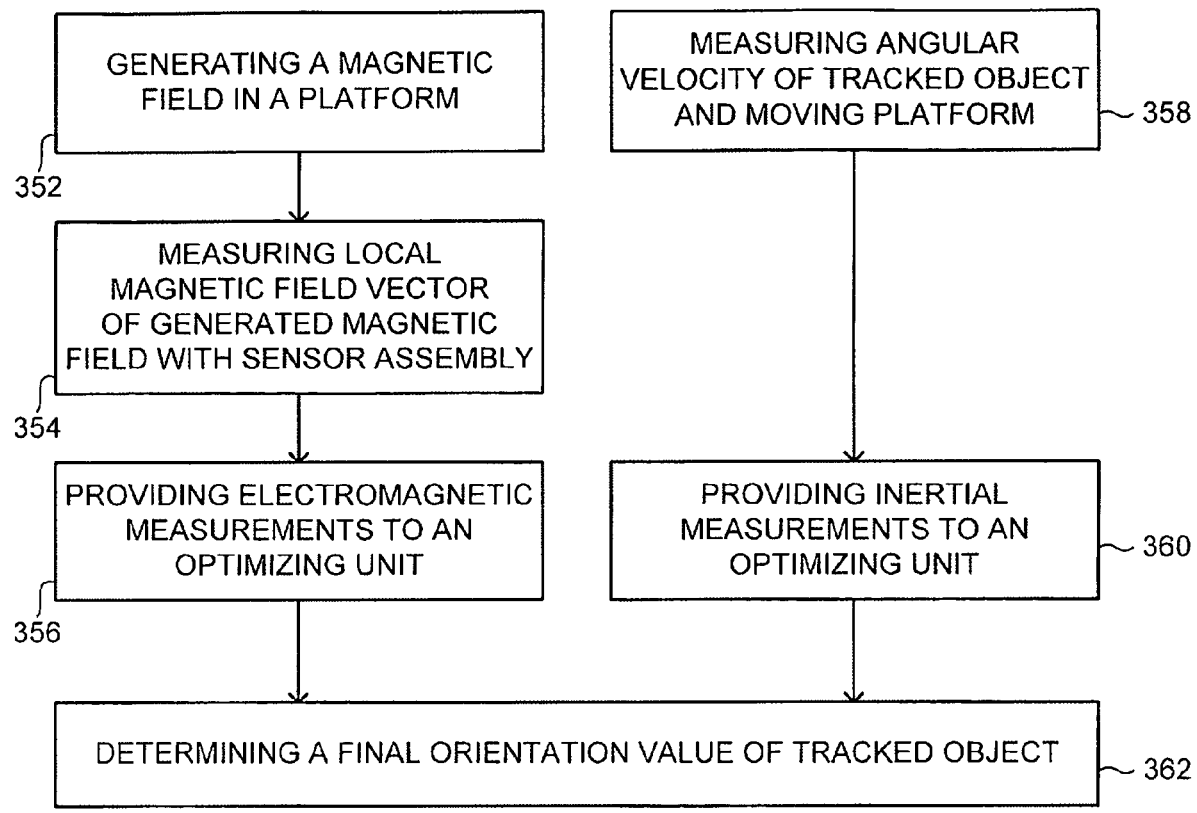
FIG. 8 is a block diagram of a method for hybrid tracking, operative in accordance with a further embodiment of the disclosed technique.

Reference is now made to FIG. 8, which is a block diagram of a method for hybrid tracking, operative in accordance with a further embodiment of the disclosed technique. In procedure 352, a magnetic field is generated in a platform. Procedure 352 is analogous to procedure 302 discussed with reference to FIG. 6. In procedure 354, the local magnetic field vector of the generated magnetic field is measured. Procedure 354 is analogous to procedure 304 discussed with reference to FIG. 6. In general, transmitter assembly 116 and sensor assembly 120₁ communicate using magnetic fields in procedures 352 and 354.

In procedure 356, the EM measurements are provided to an optimizing unit. With reference to FIGS. 1 and 4, sensor assembly 120₁ provides EM measurements to position optimizer unit 192.

In procedure 358, the angular velocity of the tracked object and the angular velocity of the moving platform are measured. Procedure 358 is analogous to procedure 308 discussed with reference to FIG. 6. In procedure 360, the inertial measurements are provided to an optimizing unit. With reference to FIGS. 1 and 4, IMU 126 and INS 128 provide inertial measurements to position optimizer unit 192.

In procedure 362, all inputted raw data is optimized to obtain a final orientation value of the tracked object. With reference to FIG. 4, position optimizer unit 192 determines a final orientation value $\vec{o}_{final}$ of the pilot helmet by minimizing the general cost function of Equation (5). Position optimizer unit 192 solves Equation (5) using a non-linear minimization technique, as is known in the art. Position optimizer unit 192 outputs final orientation value $\vec{o}_{final}$.

Figure 9:
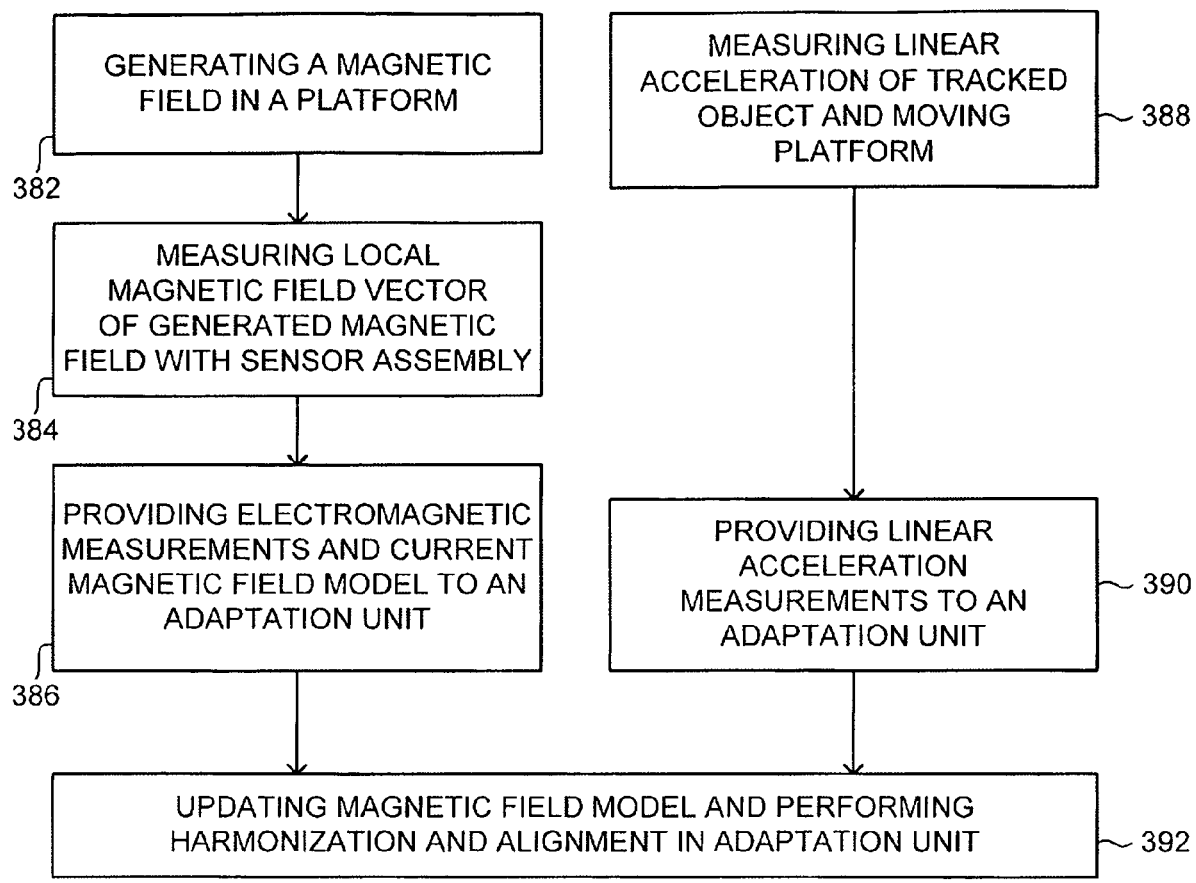
FIG. 9 is a block diagram of a method for hybrid tracking, operative in accordance with yet another embodiment of the disclosed technique.

Reference is now made to FIG. 9, which is a block diagram of a method for hybrid tracking, operative in accordance with yet another embodiment of the disclosed technique. In procedure 382, a magnetic field is generated in a platform. Procedure 382 is analogous to procedure 302 discussed with reference to FIG. 6. In procedure 384, the local magnetic field vector of the generated magnetic field is measured. Procedure 384 is analogous to procedure 304 discussed with reference to FIG. 6. In general, transmitter assembly 116 and sensor assembly 120₁ communicate using magnetic fields in procedures 382 and 384.

In procedure 386, the EM measurements and the current magnetic field model are provided to an adaptation unit. With reference to FIGS. 1 and 5, sensor assembly 120₁ provides the EM measurements to EM adaptive unit 196. Tracking processor 194 provides current magnetic field model $\vec{F}^{emModel}$ to EM adaptive unit 196.

In procedure 388, the linear acceleration of the tracked object and the linear acceleration of the moving platform are measured. With reference to FIG. 1, IMU 126 measures all three components of the linear acceleration $\vec{a}$ of the helmet, relative to the inertially fixed reference frame. In addition, INS 128 measures all three components of the linear acceleration $\vec{a}^{platform}$ of the moving platform relative to the inertially fixed reference frame.

In procedure 390, the linear acceleration measurements are provided to an adaptation unit. With reference to FIGS. 1 and 5, IMU 126 and INS 128 provide the measurements of $\vec{a}$ and $\vec{a}^{platform}$, respectively, to EM adaptive unit 196.

In procedure 392, the current magnetic field model is updated and harmonization is performed in an adaptation unit. With reference to FIG. 5, EM adaptive unit 196 receives all the input data and updates the current magnetic field model $\vec{F}^{emModel}$ to obtain a new magnetic field model. EM adaptive unit 196 also performs harmonization to obtain the necessary coordinate system transformation, using Equation (6). EM adaptive unit 196 outputs the new magnetic field model $\vec{F}^{emModel}$, along with the necessary transformations, which are stored in tracking processor 194.

It will be appreciated by persons skilled in the art that the disclosed technique is not limited to what has been particularly shown and described hereinabove. Rather the scope of the disclosed technique is defined only by the claims, which follow.

The invention claimed is:

1. Apparatus for determining the position of a selected object relative to a moving reference frame, the apparatus comprising:
   at least one reference frame transceiver assembly, firmly attached to said moving reference frame;
   at least one object transceiver assembly, firmly attached to said selected object, said at least one object transceiver assembly communicating with said at least one reference frame transceiver assembly using magnetic fields;

an inertial measurement unit (IMU), firmly attached to said selected object, said IMU producing IMU inertial measurements of motion of said selected object with respect to an inertially fixed reference frame;

an inertial navigation system (INS), firmly attached to said moving reference frame, said INS producing INS inertial measurements of motion of said moving reference frame with respect to said inertially fixed reference frame; and a tracking processor, coupled with said at least one object transceiver assembly, said IMU and said INS, said tracking processor receiving electromagnetic measurements resulting from the magnetic communication between said at least one reference frame transceiver assembly and said at least one object transceiver assembly, said tracking processor determining the position of said selected object relative to said moving reference frame by using said IMU inertial measurements and said INS inertial measurements to optimize said electromagnetic measurements;

wherein said tracking processor includes a position estimator, a relative angular velocity estimator, an electromagnetic angular velocity estimator coupled with said position estimator, an angular velocity optimizer coupled with said relative angular velocity estimator and with said electromagnetic angular velocity estimator, and a filter module coupled with said position estimator, with said angular velocity optimizer, and with said relative angular velocity estimator, wherein said position estimator estimates the position of said at least one object transceiver assembly using electromagnetic tracking;

wherein said electromagnetic angular velocity estimator estimates at least the angular velocity of said at least one object transceiver assembly based on said received electromagnetic measurements;

wherein said relative angular velocity estimator estimates at least the relative angular velocity between said IMU and said INS;

wherein said angular velocity optimizer receives an electromagnetic based angular velocity from said electromagnetic angular velocity estimator, and receives an inertial based angular velocity from said relative angular velocity estimator, and further optimally combines said electromagnetic based angular velocity and said inertial based angular velocity to obtain a final relative angular velocity; and wherein said filter module receives said final relative angular velocity from said angular velocity optimizer, and further determines at least the orientation of said selected object relative to a moving reference frame using said final relative angular velocity.

2. The apparatus according to claim 1, further including a sensor interface coupled with said at least one object transceiver assembly, aid sensor interface receiving said electromagnetic measurements from said at least one object transceiver assembly and providing said electromagnetic measurements to said tracking processor.

3. The apparatus according to claim 1, wherein said IMU inertial measurements of motion includes three angular velocity components and three linear acceleration components of said selected object with respect to an inertially fixed reference frame; and herein said INS inertial measurements of motion includes three angular velocity components and three linear acceleration components of said moving reference frame with respect to said inertially fixed reference frame.

4. Apparatus for determining the position of a selected object relative to a moving reference frame, the apparatus comprising:

at least one reference frame transceiver assembly, firmly attached to said moving reference frame;

at least one object transceiver assembly, firmly attached to said selected object, said at least one object transceiver assembly communicating with said at least one reference frame transceiver assembly using magnetic fields;

an inertial measurement unit (IMU), firmly attached to said selected object, said IMU producing IMU inertial measurements of motion of said selected object with respect to an inertially fixed reference frame;

an inertial navigation system (INS), firmly attached to said moving reference frame, said INS producing INS inertial measurements of motion of said moving reference frame with respect to said inertially fixed reference frame, and a tracking processor, coupled with said at least one object transceiver assembly, said IMU and said INS, said tracking processor receiving electromagnetic measurements resulting from the magnetic communication between said at least one reference frame transceiver assembly and said at least one object transceiver assembly, said tracking processor determining the position of said selected object relative to said moving reference frame by using said IMU inertial measurements and said INS inertial measurements to optimize said electromagnetic measurements, wherein said tracking processor includes a position estimator, a relative angular velocity estimator, and a filter module coupled with said position estimator and with said relative angular velocity estimator, wherein said position estimator estimates the position of said at least one object transceiver assembly using electromagnetic tracking;

wherein said relative angular velocity estimator estimates at least the relative angular velocity between said IMU and said INS; and wherein said filter module integrates said relative angular velocity to obtain an inertial based orientation estimate, further receives an electromagnetic based orientation estimate from said position estimator, and further determines at least the orientation of said selected object relative to a moving reference frame from said electromagnetic based orientation estimate and said inertial based orientation estimate.

5. The apparatus according to claim 4, wherein said tracking processor thereby determines at least the orientation of said selected object relative to a moving reference frame by combining said electromagnetic measurements with a relative angular velocity obtained from said IMU inertial measurements and said INS inertial measurements.

6. The apparatus according to claim 4, wherein said relative angular velocity estimator further estimates the relative linear acceleration between said IMU and said INS; and wherein said filter module further double integrates said relative linear acceleration to obtain an inertial based location estimate, further receives an electromagnetic based location estimate from said position estimator, and further determines the location of said selected object relative to a moving reference frame from said electromagnetic based location estimate and said inertial based location estimate.

7. The apparatus according to claim 4, wherein said filter module adjusts the weight given to either of said electromagnetic based orientation estimate and said inertial based orientation estimate, depending on the level of confidence thereof.

8. Apparatus for determining the position of a selected object relative to a moving reference frame, the apparatus comprising:
- at least one reference frame transceiver assembly, firmly attached to said moving reference frame;
- at least one object transceiver assembly, firmly attached to said selected object, said at least one object transceiver assembly communicating with said at least one reference frame transceiver assembly using magnetic fields;
- an inertial measurement unit (IMU), firmly attached to said selected object, said IMU producing IMU inertial measurements of motion of said selected object with respect to an inertially fixed reference frame;
- an inertial navigation system (INS), firmly attached to said moving reference frame, said INS producing INS inertial measurements of motion of said moving reference frame with respect to said inertially fixed reference frame; and
- a tracking processor, coupled with said at least one object transceiver assembly, said IMU and said INS, said tracking processor receiving electromagnetic measurements resulting from the magnetic communication between said at least one reference frame transceiver assembly and said at least one object transceiver assembly, said tracking processor determining the position of said selected object relative to said moving reference frame by using said IMU inertial measurements and said INS inertial measurements to optimize said electromagnetic measurements,
- wherein said tracking processor includes a position optimizer unit,
- wherein said position optimizer unit receives said electromagnetic measurements and said inertial measurements, and determines the position of said selected object relative to a moving reference frame by minimizing a general cost function, said general cost function combining said electromagnetic measurements, said IMU inertial measurements and said INS inertial measurements in a single step.

9. The apparatus according to claim 8, wherein said tracking processor thereby determines the position of said selected object relative to a moving reference frame by combining said electromagnetic measurements, said IMU inertial measurements and said INS inertial measurements in a single step.

10. Method for determining the position of a selected object relative to a moving reference frame, the method comprising the procedures of:
- communicating using magnetic fields;
- producing IMU inertial measurements of motion of said selected object with respect to an inertially fixed reference frame;
- producing INS inertial measurements of motion of said moving reference frame with respect to said inertially fixed reference frame;
- receiving electromagnetic measurements resulting from the magnetic communication;
- determining the position of said selected object relative to said moving reference frame by using said IMU inertial measurements and said INS inertial measurements to optimize said electromagnetic measurements;
- wherein said procedure of receiving electromagnetic measurements resulting from the magnetic communication involves estimating the position of said selected object using electromagnetic tracking; and
- wherein said procedure of determining the position of said selected object involves:
  - estimating at least the relative angular velocity of said selected object with respect to said moving platform;
  - integrating the relative angular velocity estimate to obtain an inertial based orientation estimate of said selected object with respect to said moving platform;
  - receiving an electromagnetic based orientation estimate; and
  - determining at least an orientation of said selected object relative to a moving reference frame from said electromagnetic based orientation estimate and said inertial based orientation estimate.

11. The method to claim 10, wherein said IMU inertial measurements of motion includes three angular velocity components and three linear acceleration components of said selected object with respect to an inertially fixed reference frame; and
- wherein said INS inertial measurements of motion includes three angular velocity components and three linear acceleration components of said moving reference frame with respect to said inertially fixed reference frame.

12. The method according to claim 10, wherein said procedure of determining the position of said selected object involves combining electromagnetic measurements with a relative angular velocity obtained from inertial measurements.

13. The method according to claim 10, wherein said procedure of determining the position of said selected object involves:
- further estimating the relative linear acceleration of said selected object with respect to said moving platform;
- further double integrating the relative linear acceleration estimate to obtain an inertial based location estimate of said selected object with respect to said moving platform;
- further receiving an electromagnetic based location estimate; and
- further determining the location of said selected object relative to a moving reference frame from said electromagnetic based location estimate and said inertial based location estimate.

14. The method according to claim 10, wherein said procedure of determining the position of said selected object involves determining the position of said selected object relative to a moving reference frame by minimizing a general cost function, said general cost function combining said electromagnetic measurements and said inertial measurements in a single step.

15. The method according to claim 14, wherein said tracking processor thereby determines said procedure of determining the position of said selected object thereby involves determining the position of said selected object relative to a moving reference frame by combining said electromagnetic measurements, said IMU inertial measurements and said INS inertial measurements in a single step.

16. The method according to claim 10, further including the procedure of:
- performing harmonization of electromagnetic components, said harmonization involving receiving said electromagnetic measurements, an at least one IMU linear acceleration component of said selected object, an at least one INS linear acceleration component of said selected object, and a magnetic field model, and determining the orientation of a magnetic field model coordinate system with respect to the coordinate system of said moving reference frame by minimizing a general cost function.

17. The apparatus according to claim 1, wherein said filter module comprises a Kalman filter.

18. The apparatus according to claim 4, wherein said filter module comprises a Kalman filter.

* * * * *